US010255903B2

(12) United States Patent
Dachiraju et al.

(10) Patent No.: US 10,255,903 B2
(45) Date of Patent: Apr. 9, 2019

(54) METHOD FOR FORMING THE EXCITATION SIGNAL FOR A GLOTTAL PULSE MODEL BASED PARAMETRIC SPEECH SYNTHESIS SYSTEM

(71) Applicant: Interactive Intelligence Group, Inc., Indianapolis, IN (US)

(72) Inventors: Rajesh Dachiraju, Hyderabad (IN); E. Veera Raghavendra, Hyderabad (IN); Aravind Ganapathiraju, Hyderabad (IN)

( * ) Notice: Subject to any disclaimer, the term of this patent is extended or adjusted under 35 U.S.C. 154(b) by 0 days.

(21) Appl. No.: 14/875,778

(22) Filed: Oct. 6, 2015

(65) Prior Publication Data

US 2016/0027430 A1 Jan. 28, 2016

Related U.S. Application Data

(63) Continuation-in-part of application No. 14/288,745, filed on May 28, 2014, now Pat. No. 10,014,007.

(51) Int. Cl.
*G10L 15/04* (2013.01)
*G10L 15/05* (2013.01)
(Continued)

(52) U.S. Cl.
CPC ............ *G10L 13/027* (2013.01); *G10L 13/02* (2013.01); *G10L 13/06* (2013.01)

(58) Field of Classification Search
CPC ......... G10L 15/04; G10L 15/05; G10L 15/06; G10L 21/0208; G10L 2021/02168
(Continued)

(56) References Cited

U.S. PATENT DOCUMENTS

| | | |
|---|---|---|
| 5,377,301 A | 12/1994 | Rosenberg et al. |
| 5,400,434 A | 3/1995 | Pearson |

(Continued)

FOREIGN PATENT DOCUMENTS

| | | |
|---|---|---|
| EP | 2242045 B1 | 6/2012 |
| JP | 2002244689 A | 8/2002 |

(Continued)

OTHER PUBLICATIONS

Drugman et al., "Detection of Glottal Closure Instants From Speech Signals: A Quantitative Review," Journal IEEE Transactions on Audio, Speech, and Language Processing, vol. 20 Issue 3, Mar. 2012, p. 994-1006.*

(Continued)

*Primary Examiner* — Richemond Dorvil
*Assistant Examiner* — Rodrigo A Chavez

(57) ABSTRACT

A system and method are presented for forming the excitation signal for a glottal pulse model based parametric speech synthesis system. The excitation signal may be formed by using a plurality of sub-band templates instead of a single one. The plurality of sub-band templates may be combined to form the excitation signal wherein the proportion in which the templates are added is dynamically based on determined energy coefficients. These coefficients vary from frame to frame and are learned, along with the spectral parameters, during feature training. The coefficients are appended to the feature vector, which comprises spectral parameters and is modeled using HMMs, and the excitation signal is determined.

12 Claims, 5 Drawing Sheets

(51) Int. Cl.
*G10L 15/06* (2013.01)
*G10L 21/0208* (2013.01)
*G10L 13/027* (2013.01)
*G10L 13/02* (2013.01)
*G10L 13/06* (2013.01)

(58) Field of Classification Search
USPC ..... 704/7, 10, 201, 208, 210, 215, 224, 234, 704/248
See application file for complete search history.

(56) References Cited

U.S. PATENT DOCUMENTS

| | | | | |
|---|---|---|---|---|
| 5,680,508 | A * | 10/1997 | Liu | G10L 19/04 704/227 |
| 5,937,384 | A | 8/1999 | Huang et al. | |
| 5,953,700 | A | 9/1999 | Kanevsky et al. | |
| 6,088,669 | A | 7/2000 | Maes | |
| 6,795,807 | B1 | 9/2004 | Baraff | |
| 7,337,108 | B2 * | 2/2008 | Florencio | G10L 21/04 704/208 |
| 7,386,448 | B1 | 6/2008 | Poss et al. | |
| 8,386,256 | B2 | 2/2013 | Raitio et al. | |
| 8,571,871 | B1 * | 10/2013 | Stuttle | G10L 13/033 704/260 |
| 2002/0116196 | A1 | 8/2002 | Tran | |
| 2002/0120450 | A1 * | 8/2002 | Junqua | G10L 13/04 704/258 |
| 2009/0024386 | A1 * | 1/2009 | Su | G10L 19/09 704/201 |
| 2009/0119096 | A1 * | 5/2009 | Gerl | G10L 21/0208 704/207 |
| 2011/0038445 | A1 * | 2/2011 | Zhou | H04L 25/0204 375/346 |
| 2011/0040561 | A1 | 2/2011 | Vair et al. | |
| 2011/0115798 | A1 * | 5/2011 | Nayar | G06T 13/40 345/473 |
| 2011/0161076 | A1 * | 6/2011 | Davis | G06F 3/04842 704/231 |
| 2011/0262033 | A1 * | 10/2011 | Huo | G06K 9/00422 382/161 |
| 2012/0123782 | A1 | 5/2012 | Wilfart et al. | |
| 2013/0080172 | A1 | 3/2013 | Talwar et al. | |
| 2013/0262096 | A1 | 10/2013 | Wilhelms-Tricarico et al. | |
| 2014/0039722 | A1 | 2/2014 | Kondoh | |
| 2014/0142946 | A1 | 5/2014 | Chen | |
| 2014/0156280 | A1 | 6/2014 | Ranniery | |
| 2014/0222428 | A1 | 8/2014 | Cumani et al. | |
| 2015/0100308 | A1 * | 4/2015 | Bedrax-Weiss | G06F 17/2735 704/10 |
| 2015/0348535 | A1 | 12/2015 | Dachiraju et al. | |

FOREIGN PATENT DOCUMENTS

| | | | |
|---|---|---|---|
| JP | 2010230704 | A | 10/2010 |
| JP | 2012524288 | A | 10/2012 |
| JP | 2013182872 | A | 9/2013 |
| WO | 2015183254 | A1 | 12/2015 |

OTHER PUBLICATIONS

International Search Report and Written Opinion of the International Searching Authority, dated Jan. 8, 2016 in related PCT application PCT/US15/54122 (Interational Filing Date Oct. 6, 2015).
Chilean Office Action for Application No. 201603049, dated Jul. 17, 2018, 6 pages.
Cabral, J., et al.; Glottal Spectral Separation for Speech Synthesis, IEEE Journal of Selected Topics in Signal Processing, vol. 8, No. 2, Apr. 2014, 14 pages.
Chilean Office Action for Application No. 201603049, dated Mar. 16, 2018, 6 pages.
Extended European Search Report for Application No. 14893138.9, dated Jan. 3, 2018, 16 pages.
Gabor, T., et al., A novel codebook-based excitation model for use in speech synthesis, CogInfoCom 2012, 3rd IEEE International Conference on Cognitive Infocommunications, Dec. 2-5, 2012, 5 pages.
International Search Report and Written Opinion for Application No. PCT/US2017/036806, dated Aug. 11, 2017, 14 pages.
Japanese Office Action with English Translation for Application No. 2016-567717, dated Feb. 1, 2018, 12 pages.
Murty, K. Sri Rama., et al.; Epoch Extraction From Speech Signals, IEEE Trans. ASLP, EEE, Oct. 21, 2008, vol. 16. No. 8, pp. 1602-1613.
Prathosh, A.P., et al.; Epoch Extraction Based on Integrated Linear Prediction Residual Using Plosion Index, IEEE Transactions on Audio, Speech, and Language Processing, vol. 21, No. 12, Dec. 2013, 10 pages.
Raitio, T., et al.; Comparing Glottal-Flow-Excited Statistical Parametric Speech Synthesis Methods, Article, IEEE, 2013, 5 pages.
Srinivas, K, et al.; An FIR Implementation of Zero Frequency Filtering of Speech Signals, IEEE Transactions on Audio, Speech, and Language Processing, vol. 20, No. 9, Nov. 2012, 5 pages.
Thakur_A, et al.; Speech Recognition Using Euclidean Distance, International Journal of Emerging Technology and Advanced Engineering, Website: www.ijetae.com (ISSN 2250-2459, ISO 9001:2008 Certified Journal, vol. 3, Issue 3, Mar. 2013), 4 pages.
Yoshikawa, Eiichi et al.; A Proposal for Estimation Algorithm of Glottal Waveform with Glottal Closure Information with English Translation, IEEE, Article (J81-A), No. 3, Mar. 25, 1998, pp. 303-311.
International Search Report and Written Opinion of the International Searching Authority dated Apr. 6, 2015 in related foreign application PCT/US 14/39722 (International filing date May. 28, 2014).

* cited by examiner

METHOD FOR FORMING THE EXCITATION SIGNAL FOR A GLOTTAL PULSE MODEL BASED PARAMETRIC SPEECH SYNTHESIS SYSTEM

BACKGROUND

The present invention generally relates to telecommunications systems and methods, as well as speech synthesis. More particularly, the present invention pertains to the formation of the excitation signal in a Hidden Markov Model based statistical parametric speech synthesis system.

SUMMARY

A system and method are presented for forming the excitation signal for a glottal pulse model based parametric speech synthesis system. The excitation signal may be formed by using a plurality of sub-band templates instead of a single one. The plurality of sub-band templates may be combined to form the excitation signal wherein the proportion in which the templates are added is dynamically based on determined energy coefficients. These coefficients vary from frame to frame and are learned, along with the spectral parameters, during feature training. The coefficients are appended to the feature vector, which comprises spectral parameters and is modeled using HMMs, and the excitation signal is determined.

In one embodiment, a method is presented for creating parametric models for use in training a speech synthesis system, wherein the system comprises at least a training text corpus, a speech database, and a model training module, the method comprising: obtaining, by the model training module, speech data for the training text corpus, wherein the speech data comprises recorded speech signals and corresponding transcriptions; converting, by the model training module, the training text corpus into context dependent phone labels; extracting, by the model training module, for each frame of speech in the speech signal from the speech training database, at least one of: spectral features, a plurality of band excitation energy coefficients, and fundamental frequency values; forming, by the model training module, a feature vector stream for each frame of speech using the at least one of: spectral features, a plurality of band excitation energy coefficients, and fundamental frequency values; labeling speech with context dependent phones; extracting durations of each context dependent phone from the labelled speech; performing parameter estimation of the speech signal, wherein the parameter estimation is performed comprising the features, HMM, and decision trees; and identifying a plurality of sub-band Eigen glottal pulses, wherein the sub-band Eigen glottal pulses comprise separate models used to form excitation during synthesis.

In another embodiment, a method is presented for identification of sub-band Eigen pulses from a glottal pulse database for training a speech synthesis system, wherein the method comprises: receiving pulses from the glottal pulse database; decomposing each pulse into a plurality of sub-band components; dividing the sub-band components into a plurality of databases based on the decomposing; determining a vector representation of each database; determining Eigen pulse values, from the vector representation, for each database; and selecting a best Eigen pulse for each database for use in synthesis.

CROSS-REFERENCE TO RELATED APPLICATIONS

Figure 1:
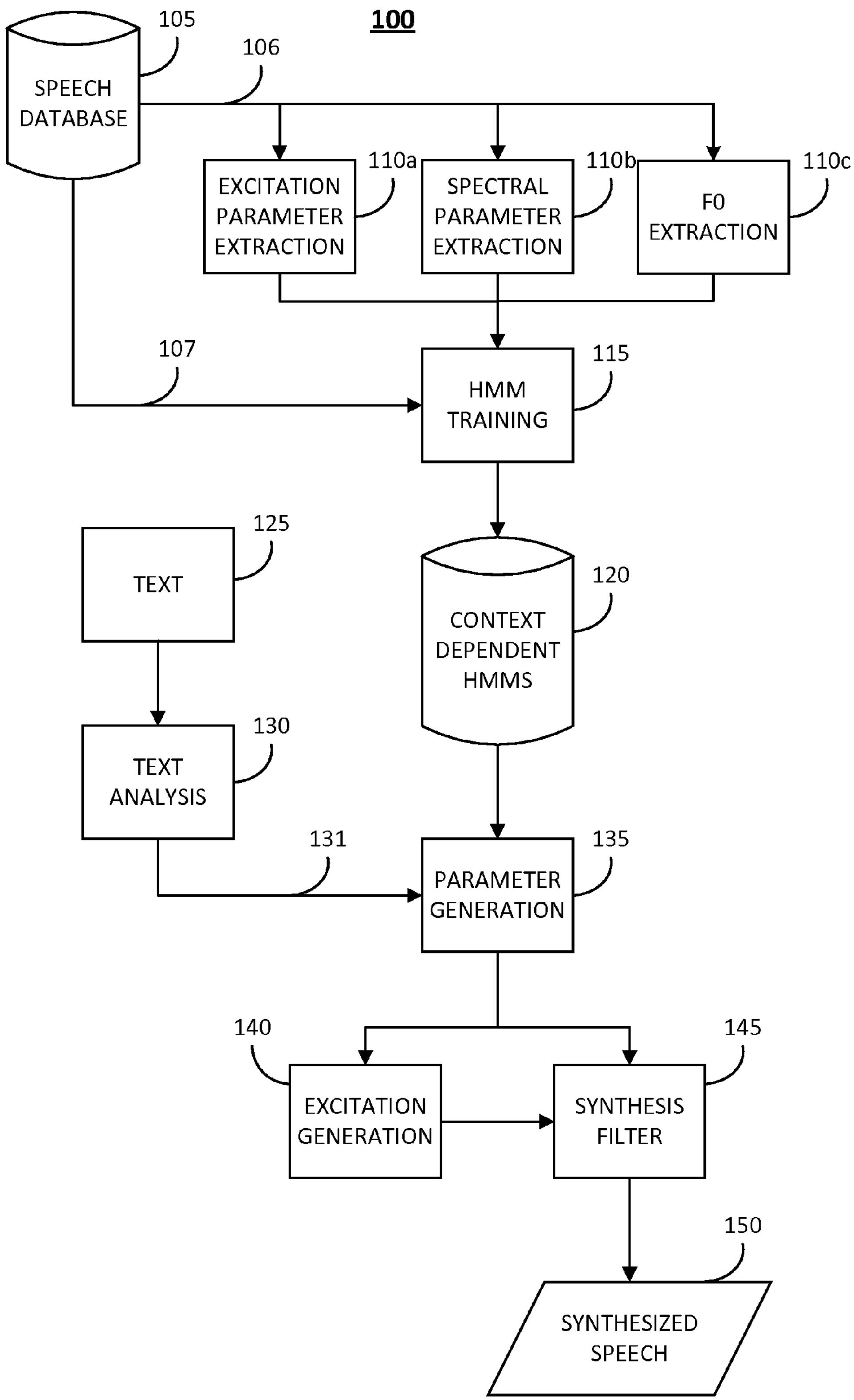
FIG. 1 is a diagram illustrating an embodiment of a Hidden Markov Model based text to speech system.

This application is a Continuation-In-Part of U.S. application Ser. No. 14/288,745 filed May 28, 2014, entitled "Method for Forming the Excitation Signal for a Glottal Pulse Model Based Parametric Speech Synthesis System", the contents of which are incorporated in part herein.

DETAILED DESCRIPTION

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

In speech synthesis, excitation is generally assumed to be a quasi-periodic sequence of impulses for voiced regions. Each sequence is separated from the previous sequence by some duration, such as $$T_0 = \frac{1}{F_0},$$

where $T_0$ represents pitch period and $F_0$ represents fundamental frequency. In unvoiced regions, it is modeled as white noise. However, in voiced regions, the excitation is not actually impulse sequences. The excitation is instead a sequence of voice source pulses which occur due to vibration of the vocal folds and their shape. Further, the pulses' shapes may vary depending on various factors such as: the speaker, the mood of the speaker, the linguistic context, emotions, etc.

Source pulses have been treated mathematically as vectors by length normalization (through resampling) and impulse alignment, as described in European Patent EP 2242045 (granted Jun. 27, 2012, inventors Thomas Drugman, et al.), for example. The final length of the normalized source pulse signal is resampled to meet the target pitch. The source pulse is not chosen from a database, but obtained over a series of calculations which compromise the pulse characteristics in the frequency domain. Modeling of the voice source pulses has traditionally been done using acoustic parameters or excitation models for HMM based systems, however, the models interpolate/re-sample the glottal/residual pulse to meet the target pitch period, which compromises the model pulse characteristics in the frequency domain. Other methods have used canonical ways of choosing the pulse, but convert residual pulses into equal length vectors by length normalization. These methods also perform PCA over these vectors, which makes the final pulse selected to be a computed one, rather than something selected directly from training data.

To achieve a final pulse through selection directly from training data, as opposed to computation, glottal pulses may be modeled by defining metrics and providing a vector representation. Excitation formation, given a glottal pulse and fundamental frequency, is also presented which does not re-sample or interpolate on the pulse.

In statistical parametric speech synthesis, speech unit signals are represented by a set of parameters which can be used to synthesize speech. The parameters may be learned by statistical models, such as HMMs, for example. In an embodiment, speech may be represented as a source-filter model, wherein source/excitation is a signal which, when passed through an appropriate filter, produces a given sound. FIG. 1 is a diagram illustrating an embodiment of a Hidden Markov Model (HMM) based Text to Speech (TTS) system, indicated generally at 100. An embodiment of an exemplary system may contain two phases, for example, the training phase and the synthesis phase, each of which are described in greater detail below.

The Speech Database 105 may contain an amount of speech data for use in speech synthesis. Speech data may comprise recorded speech signals and corresponding transcriptions. During the training phase, a speech signal 106 is converted into parameters. The parameters may be comprised of excitation parameters, F0 parameters, and spectral parameters. Excitation Parameter Extraction 110*a*, Spectral Parameter Extraction 110*b*, and F0 Parameter Extraction 110*c* occur from the speech signal 106, which travels from the Speech Database 105. A Hidden Markov Model may be trained using a training module 115 using these extracted parameters and the Labels 107 from the Speech Database 105. Any number of HMM models may result from the training and these context dependent HMMs are stored in a database 120.

In another embodiment, the training phase may further include the steps of obtaining speech data by recording voice talent speaking the training text corpus. The training text corpus can be converted into context dependent phone labels. The context dependent phone labels are used to determine the spectral features of the speech data. The fundamental frequency of the speech data can also be estimated. Using the spectral features, the fundamental frequency, and the duration of the audio stream, the parameter estimation on an audio stream can be performed.

The synthesis phase begins as the context dependent HMMs 120 are used to generate parameters 135. The parameter generation 135 may utilize input from a corpus of text 125 from which speech is to be synthesized from. Prior to use in parameter generation 135, the text 125 may undergo analysis 130. During analysis 130, labels 131 are extracted from the text 125 for use in the generation of parameters 135. In one embodiment, excitation parameters and spectral parameters may be generated in the parameter generation module 135.

The excitation parameters may be used to generate the excitation signal 140, which is input, along with the spectral parameters, into a synthesis filter 145. Filter parameters are generally Mel frequency cepstral coefficients (MFCC) and are often modeled by a statistical time series by using HMMs. The predicted values of the filter and the fundamental frequency as time series values may be used to synthesize the filter by creating an excitation signal from the fundamental frequency values and the MFCC values used to form the filter. Synthesized speech 150 is produced when the excitation signal passes through the filter.

The formation of the excitation signal 140 in FIG. 1 is integral to the quality of the output, or synthesized, speech 150. Generally, spectral parameters used in a statistical parametric speech synthesis system comprise MCEPS, MGC, Mel-LPC, or Mel-LSP. In an embodiment, spectral parameters are mel-generalized cepstral (MGC) computed from the pre-emphasized speech signal, but the zeroth energy coefficient is computed from the original speech signal. In traditional systems, the fundamental frequency value alone is considered as a source parameter and the entire spectrum is considered as a system parameter. However, the spectral tilt, or the gross spectral shape, of the speech spectrum is actually a characteristic of the glottal pulse and is thus considered as a source parameter. The spectral tilt is captured and modeled for glottal pulse based excitation and excluded as a system parameter. Instead, pre-emphasized speech is used for computing the spectral parameter (MGC) with exception of the zeroth energy coefficient (energy of speech). This coefficient varies slowly in time and may be treated as a prosodic parameter computed directly from unprocessed speech.

Training and Model Construction

Figure 2:
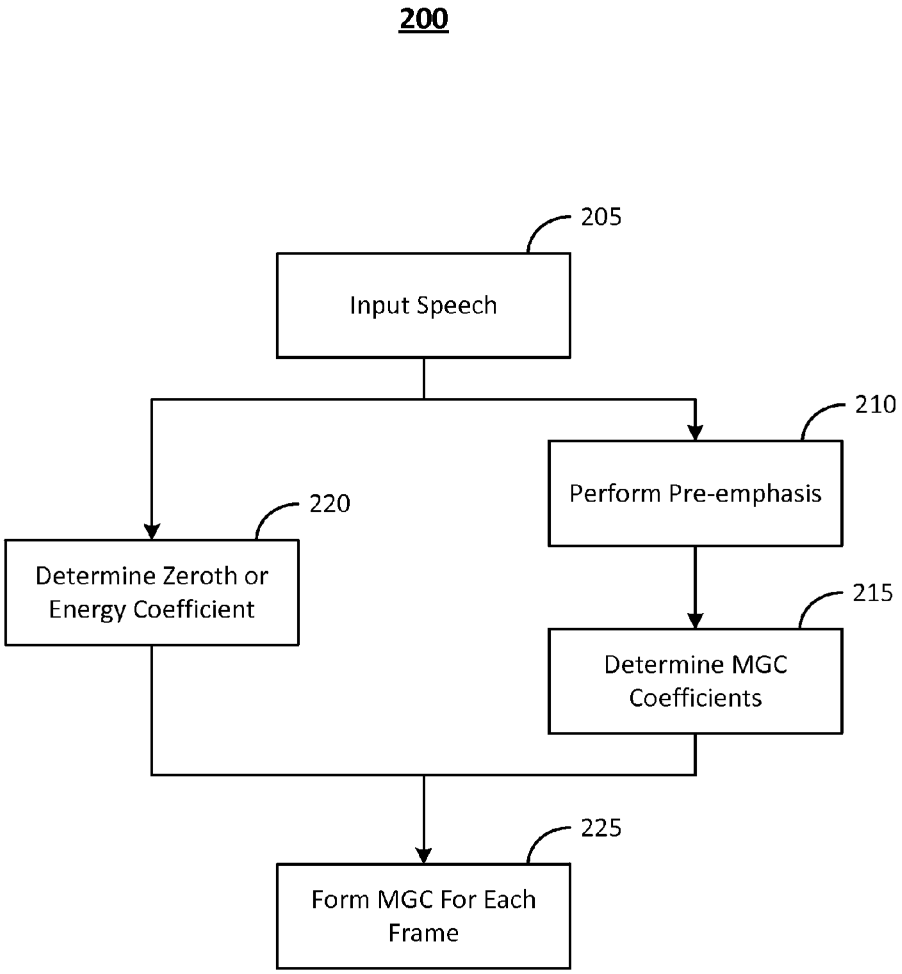
FIG. 2 is a flowchart illustrating an embodiment of a process for feature vector extraction.

FIG. 2 is a flowchart illustrating an embodiment of a process for feature vector extraction, indicated generally at 200. This process may occur during spectral parameter extraction 110*b* of FIG. 1. As previously described, the parameters may be used for model training, such as with an HMM model.

In operation 205, the speech signal is received for conversion into parameters. As shown in FIG. 1, the speech signal may be received from a speech database 105. Control is passed to operations 210 and 220 and process 200 continues. In an embodiment, operations 210 and 215 occur simultaneously with operation 220 and the determinations are all passed to operation 225.

In operation 210, the speech signal undergoes pre-emphasis. For example, pre-emphasizing the speech signal at this stage prevents low frequency source information from being captured in the determination of MGC coefficients in the next operation. Control is passed to operation 215 and process 200 continues.

In operation 215, spectral parameters are determined for each frame of speech. In an embodiment, the MGC coefficients 1-39 may be determined for each frame. Alternatively, MFCC and LSP may also be used. Control is passed to operation 225 and process 200 continues.

In operation 220, the zeroth coefficient is determined for each frame of speech. In an embodiment, this may be determined using unprocessed speech as opposed to pre-emphasized speech. Control is passed to operation 225 and process 200 continues.

In operation 225, the coefficients from operations 220 and 215 are appended to 1-39 MGC coefficients to form the 39 coefficients for each frame of speech. The spectral coefficients of a frame may then be referred to as the spectral vector. Process 200 ends.

Figure 3:
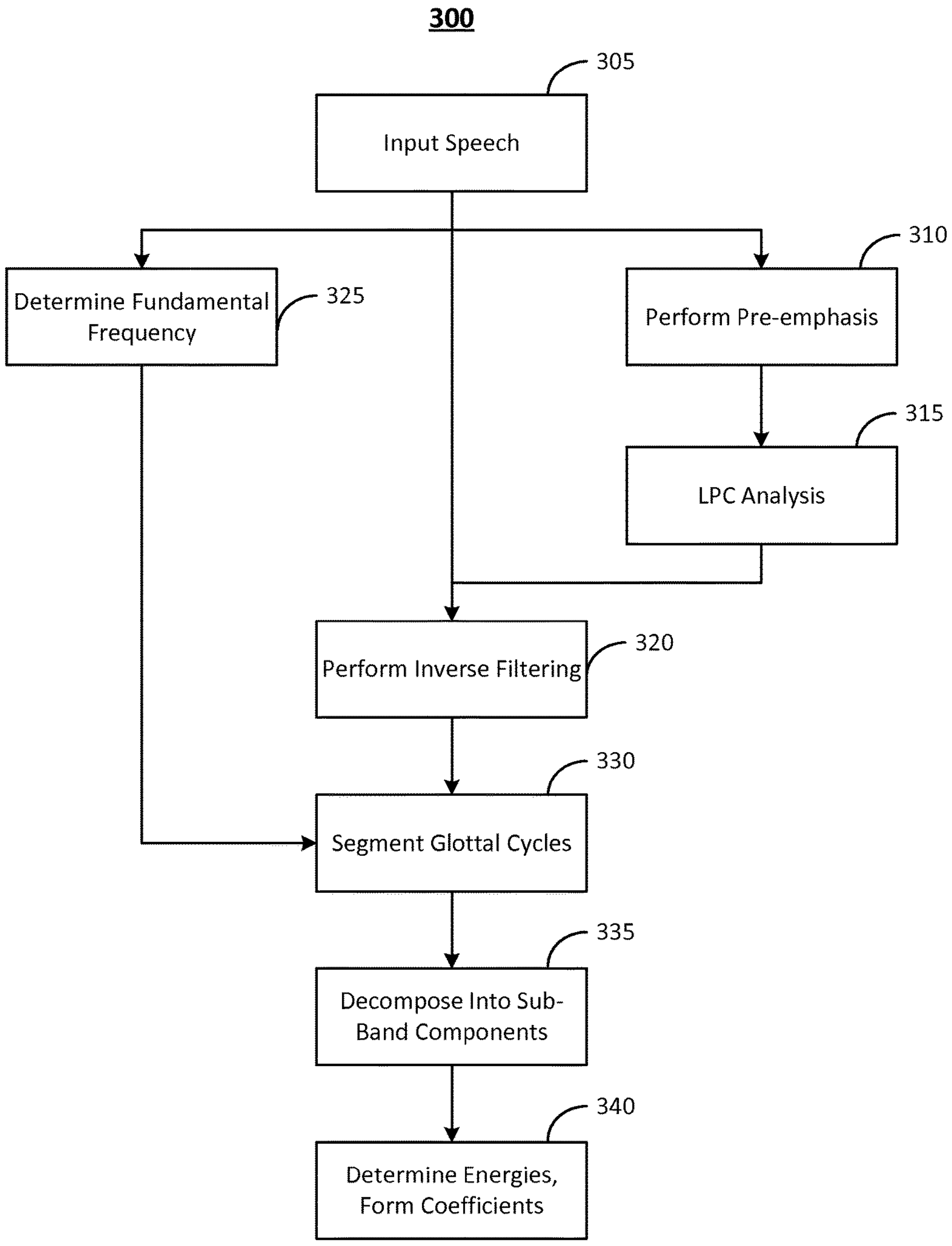
FIG. 3 is a flowchart illustrating an embodiment of a process for feature vector extraction.

FIG. 3 is a flowchart illustrating an embodiment of a process for feature vector extraction, indicated generally at 300. This process may occur during excitation parameter extraction 110*a* of FIG. 1. As previously described, the parameters may be used for model training, such as with an HMM model.

In operation 305, the speech signal is received for conversion into parameters. As shown in FIG. 1, the speech signal may be received from a speech database 105. Control is passed to operations 310, 320, and 325 and process 300 continues.

In operation 310, pre-emphasis is performed on the speech signal. For example, pre-emphasizing the speech signal at this stage prevents low frequency source information from being captured in the determination of MGC coefficients in the next operation. Control is passed to operation 315 and process 300 continues.

In operation 315, linear predictive coding, or LPC Analysis is performed on the pre-emphasized speech signal. For example, the LPC Analysis produces the coefficients which are used in the next operation to perform inverse filtering. Control is passed to operation 320 and process 300 continues.

In operation 320, inverse filtering is performed on the analyzed signal and on the original speech signal. In an embodiment, operation 320 is not performed until after pre-emphasis has been performed (operation 310). Control is passed to operation 330 and process 300 continues.

In operation 325, the fundamental frequency value is determined from the original speech signal. The fundamental frequency value may be determined using any standard techniques known in the art. Control is passed to operation 330 and process 300 continues.

In operation 330, glottal cycles are segmented. Control is passed to operation 335 and process 300 continues.

In operation 335, the glottal cycles are decomposed. For each frame, in an embodiment, the corresponding glottal cycles are decomposed into sub-band components. In an embodiment, the sub-band components may comprise a plurality of bands, wherein the bands may comprise lower and higher components.

In the spectrum of a typical glottal pulse, there is may be a higher energy bulge in the low frequency and typically flat structure in the higher frequencies. The demarcation between those bands varies from pulse to pulse as well as the energy ratio. Given a glottal pulse, the cut off frequency which separates the higher and lower bands is determined. In an embodiment, a ZFR method may be used with suitable window sizing, but applied on the spectral magnitude. A zero crossing at the edge of the low frequency bulge results, which is taken as the demarcation frequency between lower and higher bands. Two components in the time domain may be obtained by placing zeros in the higher band region of the spectrum before taking the inverse FFT to obtain the time domain version of the low frequency component of the glottal pulse and vice versa to obtain the high frequency component. Control is passed to operation 340 and process 300 continues.

In operation 340, the energies are determined for the sub-band components. For example, the energies of each sub-band component may be determined to form the energy coefficients for each frame. In an embodiment, the number of sub-band components may be two. The determination of the energies for the sub-band components may be made using any of the standard techniques known in the art. The energy coefficients of a frame is then referred to as the energy vector. Process 300 ends.

In an embodiment, two-band energy coefficients for each frame are determined from the inverse filtered speech. The energy coefficients may represent the dynamic nature of glottal excitation. The inverse filtered speech comprises an approximation to the source signal, after being segmented into glottal cycles. The two-band energy coefficients comprise energies of the low and high band components of the corresponding glottal cycle of the source signal. The energy of the lower frequency component comprises the energy coefficient of the lower band and similarly the energy of the higher frequency component comprises the energy coefficient of the higher band. The coefficients may be modeled by including them in the feature vector of corresponding frames, which are then modeled by HMM-GMM in HTS.

The two-band energy coefficients, in this non-limiting example, of the source signal are appended to the spectral parameters determined in the process 200 to form the feature stream along with the fundamental frequency values and modeled using HMMs as in a typical HMM-GMM(HTS) based TTS system. The model may then be used in Process 500, as described below, for speech synthesis.

Training for Eigen Pulse Identification

Figure 4:
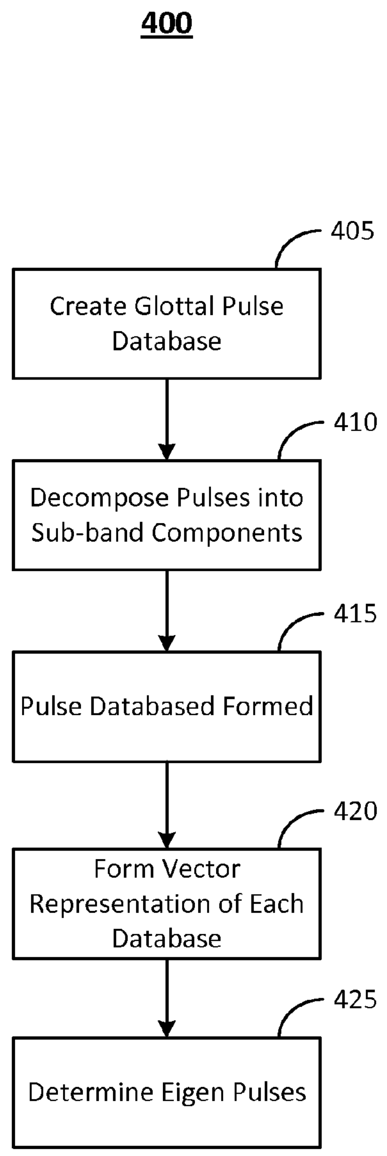
FIG. 4 is a flowchart illustrating an embodiment of a process for identification of Eigen pulses.

FIG. 4 is a flowchart illustrating an embodiment of a process for identification of Eigen pulses, indicated generally at 400. The Eigen pulses may be identified for each sub-band glottal pulse database and used in synthesis as further described below.

In operation 405, a glottal pulse database is created. In an embodiment, a database of glottal pulses is automatically created using training data (speech data) obtained from a voice talent. Given a speech signal, s(n), linear prediction analysis is performed. The signal s(n) undergoes inverse filtering to obtain the integrated linear prediction residual signal which is an approximation to glottal excitation. The integrated linear prediction residual is then segmented into glottal cycles using a technique such as zero frequency filtering, for example. A number of small signals are obtained, referred to as glottal pulses, which may be represented as $g_i(n)$, i=1, 2, 3, . . . . The glottal pulses are pooled to create the database. Control is passed to operation 410 and process 400 continues.

In operation 410, pulses from the database are decomposed into sub-band components. In an embodiment, the glottal pulses may be decomposed into a plurality of sub-band components, such as low and high band components, and the two band energy coefficients. In the spectrum of a typical glottal pulse, there is a high energy bulge in the low frequency and a typically flat structure in the high frequencies. However, the demarcation between the bands varies from pulse to pulse as does the energy ratio between these two bands. As a result, different models for both of these bands may be needed.

Given a glottal pulse, the cut off frequency is determined. In an embodiment, the cut of frequency is that which separates the higher and lower bands by using a Zero Frequency Resonator (ZFR) method with suitable window size, but applied on the spectral magnitude. A zero crossing at the edge of the low frequency bulge results, which is taken as the demarcation frequency between lower and higher bands. Two components in the time domain result from placing zeros in the higher band region of the spectrum before taking the inverse FFT to obtain the time domain version of the lower frequency component of glottal pulse and vice versa to obtain the higher frequency component. Control is passed to operation 415 and process 400 continues.

In operation 415, the pulse databases are formed. For example, a plurality of glottal pulse databases, such as a low band glottal pulse database and a high band glottal pulse database, for example, result from operation 410. In an embodiment, the number of databases formed correspond to the number of bands formed. Control is passed to operation 420 and process 400 continues.

In operation 420, vector representations are determined of each database. In an embodiment, two separate models for lower and higher band components of glottal pulses have resulted, but the same method is applied to each of these models as further described. A sub-band glottal pulse refers, in this context, to a component of glottal pulse, either high or low band.

The space of sub-band glottal pulse signals may be treated as a novel mathematical metric space as follows:

Consider the function space M of functions that are continuous, of bounded variation and of unit energy. Translations in this space are identified where f is the same as g, if g is a translated/delayed version off in time. An equivalence relation is imposed on this space where given f and g, where f and g represent any two sub-band glottal pulses, f is equivalent to g if there exists real constant $\theta \in \mathbb{R}$, such that $g = \cos(\theta) + f_h \sin(\theta)$, where $f_h$ represents the Hilbert transform of f.

A distance metric, d, may be defined over the function space M. Given f, g∈M, the normalized cross correlation between the two functions may be denoted as $r(\tau) = f \otimes g$. Let $R(\tau) = \sqrt{r(\tau)^2 + r_h(\tau)^2}$ where $r_h$ is the Hilbert transform of r. The angle between f and g may be defined as $\theta(f,g) = \sup_\tau R(\tau)$ meaning θ(f,g) assumes the maximum of value of the function R(τ). The distance metric between f,g becomes $d(f,g) = \sqrt{2(1 - \cos\theta(f,g))}$. Together with the function space M, the metric d forms a metric space (M,d).

If the metric d is a Hilbertian metric, then the space can be isometrically embedded into a Hilbert space. Thus x∈M, for a given signal in a function space, may be mapped to a vector $\Psi_x(.)$ in a Hilbert space, denoted as:

$$x \to \Psi_x(.) = \frac{1}{2}(-d^2(x, .) + d^2(x, x_0) + d^2(., x_0))$$

where $x_0$ is a fixed element in M. The zero element is represented as $\Psi_{x_0} = 0$. The mapping $\Psi_x | x \in M$ represents the total in the Hilbert space. The mapping is isometric, meaning $\|\Psi_x - \Psi_y\| = d(x,y)$.

The vector representation $\Psi_x(.)$ for a given signal x of the metric space depends on the set of distances of x from every other signal in the metric space. It is impractical to determine distances from all other points of the metric space, thus, the vector representation may depend only on the distances from a set of fixed number of points $\{c_i\}$ of the metric space which are obtained as centroids after a metric based clustering of a large set of signals from the metric space. Control is passed to operation 425 and process 400 continues.

In operation 425, Eigen pulses are determined and the process 400 ends. In an embodiment, to determine metrics for sub-band glottal pulses, a metric or notion of distance, d(x,y) between any two sub-band glottal pulses x and y is defined. The metric between two pulses f,g is defined as follows. The normalized circular cross correlation between f,g is defined as:

$$R(n) = f^{\circ} g$$

The period for circular correlation is taken to be the highest of the lengths of f,g. The shorter signal is zero extended for the purpose of computing the metric and not modified in the database. The Discrete Hilbert transform $R_h(n)$ of R(n) is determined.

Next, the signal is obtained through the mathematical equation:

$$H(n) = \sqrt{(R(n))^2 + (R_h(n))^2}$$

The cosine of the angle θ between two signals f,g may be defined as:

$$\cos\theta = \sup_n H(n)$$

where $\sup_n H(n)$ refers to the maximum value among all the samples of the signal H(n). The distance metric may be given as:

$$d(f,g) = \sqrt{2(1 - \cos(\theta))}$$

The k-means clustering algorithm, which is well known in the art, may be modified to determine k cluster centroid glottal pulses from the entire glottal pulse database G. The first modification comprises replacing the Euclidean distance metric with the metric d(x,y), defined for glottal pulses as previously described. The second modification comprises updating the centroids of the clusters. The centroid glottal pulse of a cluster of glottal pulses whose elements are denoted as $\{g_1, g_2, \ldots g_N\}$ to be that element $g_c$ such that:

$$D_m = \sum_{i=1}^{N} d^2(g_i, g_m)$$

is minimum for m=c. The clustering iterations are terminated when there is no shift in any of the centroids of the k clusters.

Vector representation for sub-band glottal pulses may then be determined. Given a glottal pulse $x_i$, and assuming $c_1, c_2, \ldots c_i, c_{256}$ are the centroid glottal pulses determined by clustering as described in previously, let the size of the glottal pulse database be L. Assigning each one to one of the centroid clusters $c_i$ based on distance metric, the total number of elements assigned to centroid $c_j$ may be defined as $n_j$. Where $x_0$ represents a fixed sub-band glottal pulse picked from the database, the vector representation may be defined as:

$$\Psi_j(x_i) = \{d^2(x_i, c_j) - d^2(x_i, c_j) - d^2(c_j, x_0)\}\frac{n_j}{L}$$

Where $V_i$ is the vector representation for the sub-band glottal pulse $x_i$, $V_i$ may be given as:

$$V_i = [\Psi_1(x_i), \Psi_2(x_i), \Psi_3(x_i), \ldots \Psi_j(x_i), \ldots \Psi_{256}(x_i)]$$

For every glottal pulse in the database, a corresponding vector is determined and stored in the data base.

The PCA in vector space is performed and the Eigen glottal pulses are identified. Principal component analysis (PCA) is performed on the collection of vectors associated with the glottal pulse database in order to obtain the Eigen vectors. The mean vector of the entire vector database is subtracted from each vector to obtain mean subtracted vectors. The Eigen vectors of the covariance matrix of the collection of vectors are then determined. With each Eigen vector obtained, a glottal pulse whose mean subtracted vector has minimum Euclidean distance from the Eigen vector is associated and called the corresponding Eigen glottal pulse. Eigen pulses for each sub-band glottal pulse database are thus determined and one from each is selected based on listening tests and may be used in synthesis as further described blow.

Use in Synthesis

Figure 5:
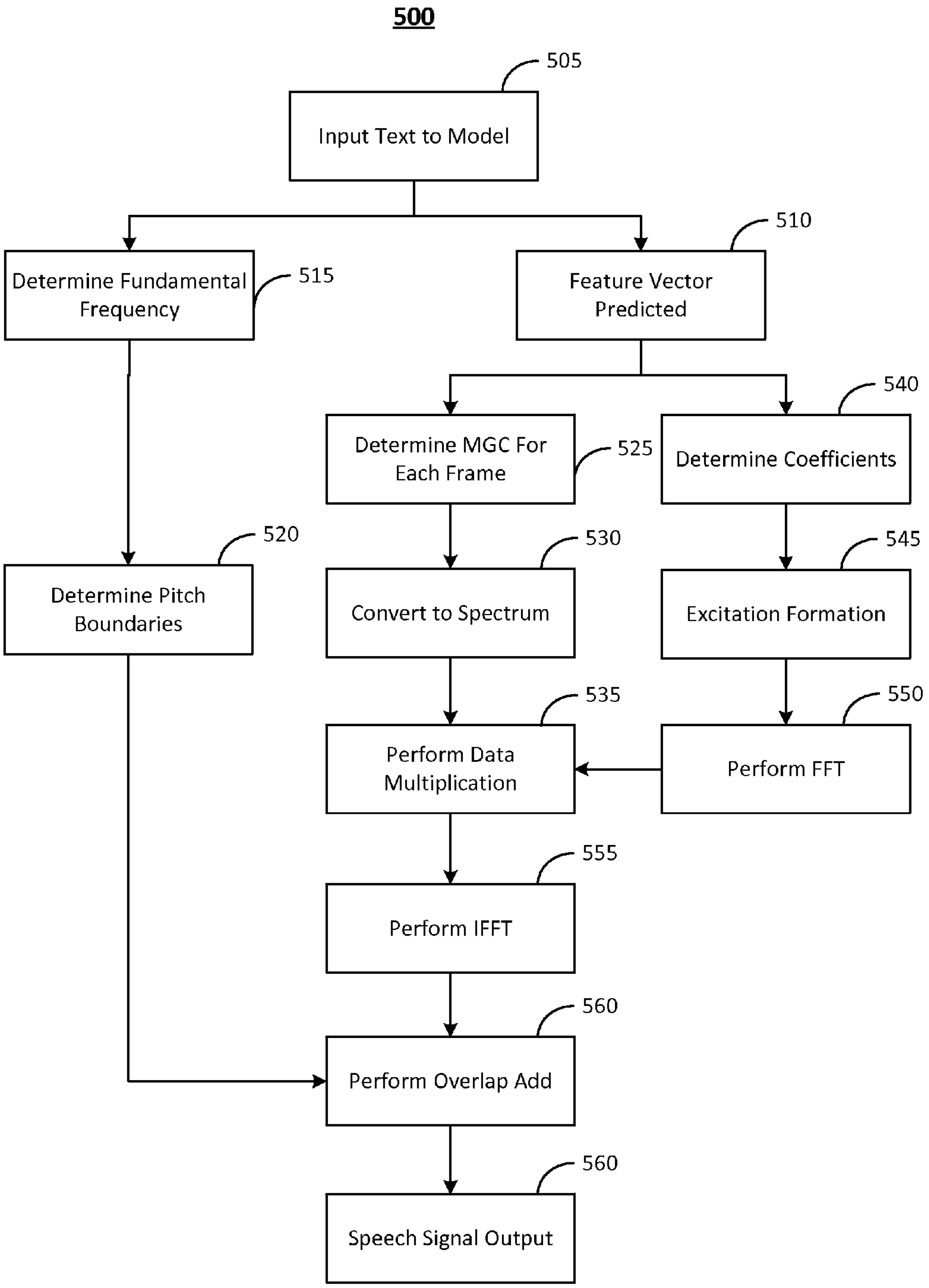
FIG. 5 is a flowchart illustrating an embodiment of a process for speech synthesis.

FIG. 5 is a flowchart illustrating an embodiment of a process for speech synthesis, indicated generally at 500. This process may be used to train the model obtained in the process 100 (FIG. 1). In an embodiment, the glottal pulse used as excitation in a particular pitch cycle is formed by combining the lower band glottal template pulse and the higher band glottal template pulse after scaling each one to the corresponding two-band energy coefficient. The two-band energy coefficients for a particular cycle are taken to be that of the frame the pitch cycle corresponds to. The excitation is formed from the glottal pulse and filtered to obtain output speech.

Synthesis may occur in the frequency domain and in the time domain. In the frequency domain, for each pitch period, the corresponding spectral parameter vector is converted into a spectrum and multiplied with the spectrum of the glottal pulse. The result undergoes inverse Discrete Fourier Transform (DFT) to obtain a speech segment corresponding to that pitch cycle. Overlap add is applied to all obtained pitch synchronous speech segments in the time domain to obtain the synthesized speech.

In the time domain, the excitation signal is constructed and filtered using a Mel Log Spectrum Approximation (MLSA) filter to obtain the synthesized speech signal. The given glottal pulse is normalized to unit energy. For unvoiced regions, white noise of fixed energy is placed in the excitation signal. For voiced regions, the excitation signal is initialized with zeros. Fundamental frequency values, such as those given for every 5 ms frame, are used to compute the pitch boundaries. The glottal pulse is placed starting from every pitch boundary and overlap added onto the zero initialized excitation signal in order to obtain the signal. Overlap add is performed on the glottal pulse at each pitch boundary and a small fixed amount of band pass filtered white noise is added to ensure that there is a small amount of random/stochastic component present in the excitation signal. To avoid a windiness effect in the synthesized speech, a stitching mechanism is applied where a number of excitation signals are formed with using right-shifted pitch boundaries and circularly left-shifted glottal pulses. The right-shift in pitch boundary used for constructing comprises a fixed constant and the glottal pulse used for it is circularly left shifted by the same amount. The final stitched excitation is the arithmetic average of the excitation signals. This is passed through the MLSA filter to obtain the speech signal.

In operation 505, text is input into the model in the speech synthesis system. For example, the model which was obtained in FIG. 1 (context dependent HMMs 120), receives input text and provides features which are subsequently used to synthesize speech pertaining to the input text as described below. Control is passed to operation 510 and operation 515 and the process 500 continues.

In operation 510, the feature vector is predicted for each frame. This may be done using methods which are standard in the art, such as context dependent decision trees, for example. Control is passed to operations 525 and 540 and operation 500 continues.

In operation 515, the fundamental frequency value(s) are determined. Control is passed to operation 520 and process 500 continues.

In operation 520, pitch boundaries are determined. Control is passed to operation 560 and process 500 continues.

In operation 525, MGC are determined for each frame. For example, the 0-39 MGC are determined. Control is passed to operation 530 and process 500 continues.

In operation 530, the MGC are converted to the spectrum. Control is passed top operation 535 and process 500 continues.

In operation 540, energy coefficients are determined for each frame. Control is passed to operation 545 and process 500 continues.

In operation 545, Eigen pulses are determined and normalized. Control is passed to operation 550 and process 500 continues.

In operation 550, FFT is applied. Control is passed to operation 535 and process 500 continues.

In operation 535, data multiplication may be performed. For example, the data from operation 550 is multiplied with that in operation 535. In an embodiment, this may be done in sample by sample multiplication. Control is passed to operation 555 and process 500 continues.

In operation 555, inverse FFT is applied. Control is passed to operation 560 and process 500 continues.

In operation 560, overlap add is performed on the speech signal. Control is passed to operation 565 and process 500 continues.

In operation 565, the output speech signal is received and the process 500 ends.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the invention as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

The invention claimed is:

1. A method performed by a processing circuit for creating parametric models for use in training a speech synthesis system, wherein the system comprises at least a training text corpus, a speech database, and a model training module, the method comprising:

a. obtaining, by the model training module, speech data from the speech database wherein the speech data comprises recorded speech signals and corresponding portions of the training text corpus;

b. converting, by the model training module, the training text corpus into context dependent phone labels;

c. extracting, by the model training module, for each frame of speech in the speech signal from the speech data, at least one of: spectral features, a plurality of band excitation energy coefficients, and fundamental frequency values using the context dependent phone labels;

d. forming, by the model training module, a feature vector stream for each frame of speech in the speech signal from the speech data using the at least one of: the spectral features, the plurality of band excitation energy coefficients, and the fundamental frequency values;

e. labeling, by the model training module, each frame of speech in the speech signal with the context dependent phone labels;

f. extracting, by the model training module, durations of each of the context dependent phone labels from the labeled speech;

g. forming, by the model training module, context dependent Hidden Markov Models (HMMs) using the feature vector streams and the context dependent phone labels from the labeled speech;

h. performing, by a parameter generation module, parameter estimation of the speech signal, wherein the parameter estimation is performed comprising the feature vector streams, the HMMs, and decision trees;

i. identifying a plurality of sub-band Eigen glottal pulses from the speech signal, wherein the sub-band Eigen glottal pulses comprise separate models used to form excitation during synthesis; and j. applying the identified plurality of sub-band Eigen glottal pulses from the speech signal to form an excitation signal, wherein the excitation signal is applied in the speech synthesis system to synthesize speech.

2. The method of claim 1, wherein the spectral features are determined comprising the steps of:

a. determining an energy coefficient from the speech signal;

b. pre-emphasizing the speech signal and determining mel-generalized cepstral (MGC) coefficients for each frame of the pre-emphasized speech signal;

c. appending the energy coefficient and the MGC coefficients to form a MGC coefficient for each frame of the signal; and d. extracting spectral vectors for each frame.

3. The method of claim 1, wherein the plurality of band excitation energy coefficients are determined comprising the steps of:

a. determining, from the speech signal, fundamental frequency values;

b. performing pre-emphasis on the speech signal;

c. performing linear predictive coding (LPC) Analysis on the pre-emphasized speech signal;

d. performing inverse filtering on the speech signal and the LPC analyzed signal;

e. segmenting glottal cycles using the fundamental frequency values and the inversely filtered speech signal;

f. decomposing corresponding glottal cycles for each frame into sub-band components;

g. computing energies of each sub-band component to form a plurality of energy coefficients for each frame; and h. using the energy coefficients to extract excitation vectors for each frame.

4. The method of claim 3, wherein the sub-band components comprise at least 2 bands.

5. The method of claim 4, wherein the sub-band components comprises at least a high band component and a low band component.

6. The method of claim 1, wherein the identifying a plurality of sub-band Eigen glottal pulses further comprises the steps of:

a. creating a glottal pulse database using the speech data;

b. decomposing each pulse into a plurality of sub-band components;

c. dividing the sub-band components into a plurality of databases based on the decomposing;

d. determining a vector representation of each database;

e. determining Eigen pulse values, from the vector representation, for each database; and f. selecting a best Eigen pulse for each database for use in synthesis.

7. The method of claim 6, wherein the plurality of sub-band components comprises low band and high band.

8. The method of claim 6, wherein the glottal database is created by:

a. performing linear prediction analysis on a speech signal;

b. performing inverse filtering of the signal to obtain an integrated linear prediction residual; and c. segmenting the integrated linear prediction residual into glottal cycles to obtain a number of glottal pulses.

9. The method of claim 6, wherein the decomposing further comprises:

a. determining a cut off frequency, wherein said cut off frequency separates the sub-band components into groupings;

b. obtaining a zero crossing at the edge of the low frequency bulge;

c. placing zeros in the higher band region of the spectrum and obtaining the time domain version of the low frequency component of glottal pulse, wherein the obtaining comprises performing inverse FFT; and d. placing zeros in the lower band region of the spectrum prior to obtaining the time domain version of the high frequency component of the glottal pulse, wherein the obtaining comprises performing inverse FFT.

10. The method of claim 9, wherein the groupings comprise a lower band grouping and a higher band grouping.

11. The method of claim 9, wherein the separating of sub-band components into groupings is performed using a ZFR method and applied on the spectral magnitude.

12. The method of claim 6, wherein the determining a vector representation of each database further comprises a set of distances from a set of fixed number of points of a metric space, obtained as centroids after a metric based clustering of a large set of signals from the metric space.

* * * * *